(12) United States Patent
Cunico et al.

(10) Patent No.: US 9,904,714 B2
(45) Date of Patent: *Feb. 27, 2018

(54) CROWD SOURCING OF DEVICE SENSOR DATA FOR REAL TIME RESPONSE

(71) Applicant: International Business Machines Corporation, Armonk, NY (US)

(72) Inventors: Hernan A. Cunico, Holly Springs, NC (US); Jonathan Dunne, Dungarvan (IE); Jeremiah O'Connor, Roscommon (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 14/754,971

(22) Filed: Jun. 30, 2015

(65) Prior Publication Data

US 2017/0004189 A1 Jan. 5, 2017

(51) Int. Cl.
*G06F 17/30* (2006.01)
*H04L 29/08* (2006.01)
*H04W 4/02* (2018.01)
*H04W 4/22* (2009.01)

(52) U.S. Cl.
CPC .. *G06F 17/30551* (2013.01); *G06F 17/30241* (2013.01); *G06F 17/30598* (2013.01); *G06F 17/30867* (2013.01); *H04L 67/22* (2013.01); *H04W 4/023* (2013.01); *H04W 4/025* (2013.01); *H04W 4/22* (2013.01)

(58) Field of Classification Search
CPC ......... G06F 17/30551; G06F 17/30241; G06F 17/30; G06F 17/30598

USPC .................................................. 707/600–899
See application file for complete search history.

(56) References Cited

U.S. PATENT DOCUMENTS 8,589,330 B2 11/2013 Petersen et al.
8,909,565 B2 12/2014 Paek et al.
2016/0335572 A1* 11/2016 Bennett ............ G06Q 10/06311

FOREIGN PATENT DOCUMENTS

WO 2015030897 A1 3/2015
WO 2015034536 A1 3/2015
WO 2015036926 A2 3/2015

OTHER PUBLICATIONS

U.S. Appl. No. 15/138,518, filed Apr. 26, 2016.
(Continued)

*Primary Examiner* — Isaac M Woo
(74) *Attorney, Agent, or Firm* — Terrile, Cannatti, Chambers & Holland, LLP; Stephen A. Terrile

(57) ABSTRACT

A crowdsourcing data analysis operation receives data from a plurality of crowd sourced devices, aggregates the data received from the plurality of crowd sourced devices and maps the data received from the plurality of crowd sourced devices to a cohort (i.e., a group of individuals used in a study who have something in common). In certain embodiments, the crowdsourcing data analysis operation analyzes the data received from the plurality of crowd sourced devices to provide a deterministic analysis to infer a likelihood of potential incidents related to a group of individuals at any given time. Additionally in certain embodiments, the mapping of the data received from the plurality of crowd sourced devices includes binding the data to a physical or logical location.

12 Claims, 6 Drawing Sheets

(56) References Cited

OTHER PUBLICATIONS

R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true &isnumber=6177717.
D. Roggen et al., Recognition of Crowd Behavior from Mobile Sensors with Pattern Analysis and Graph Clustering Methods, Networks and Heterogeneous Media, American Institute of Mathematical Sciences, vol. 6, No. 3, Sep. 2011, doi:10.3934/nhm.2011.6.521, pp. 521-544.
List of IBM Patents or Applications Treated as Related.

* cited by examiner

CROWD SOURCING OF DEVICE SENSOR DATA FOR REAL TIME RESPONSE

BACKGROUND OF THE INVENTION

Field of the Invention

The present invention relates to information handling systems. More specifically, embodiments of the invention relate to crowd sourcing of device sensor data for real time response.

Description of the Related Art

It is known to use a single sensor to detect the occurrence of an event associated with the single sensor. For example, services are available to detect if a user falls and if so to trigger an emergency response. Also, it is known to integrate a sensor into an automobile such that if an accident is detected (such as via sensing that an airbag has been deployed), location data and service request are automatically sent to an appropriate emergency service.

SUMMARY OF THE INVENTION

A system, method, and computer-readable medium are disclosed for performing a crowdsourcing data analysis operation. More specifically, the crowdsourcing data analysis operation receives data from a plurality of crowd sourced devices, aggregates the data received from the plurality of crowd sourced devices and maps the data received from the plurality of crowd sourced devices to a cohort (i.e., a group of individuals used in a study who have something in common). In certain embodiments, the crowdsourcing data analysis operation analyzes the data received from the plurality of crowd sourced devices to provide a deterministic analysis to infer a likelihood of potential incidents related to a group of individuals at any given time. Additionally in certain embodiments, the mapping of the data received from the plurality of crowd sourced devices includes binding the data to a physical or logical location. In certain embodiments, the logical location comprises a social event. Additionally, in certain embodiments, the crowdsourcing data analysis operation includes presenting a visual cue to illustrate the analysis of the data received from the plurality of crowd sourced data via a graphical representation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
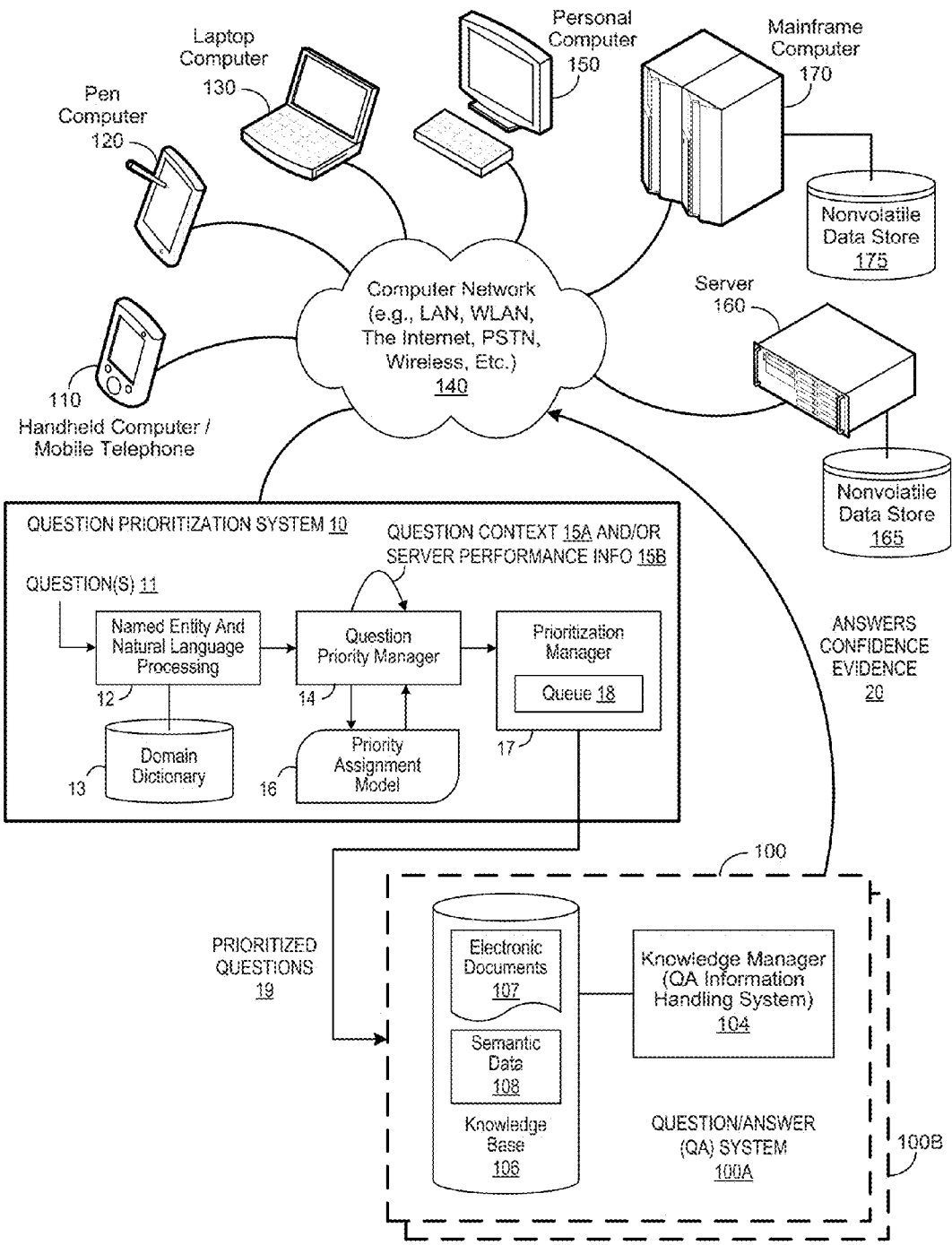
FIG. 1 shows a schematic diagram of a question prioritization system.

Early detection of events can be challenging, especially when the event occurs in a public venue and crowds are involved. Embodiments of the present invention involve a recognition that it can be especially desirable to detect negative events in such a situation. Early detection of negative events, or identifying the precursors for such events can help in preventing the occurrence of the negative event. Additionally, should such an event occur, early detection of the event can significantly reduce any negative impacts of the events and aid in a prompt response to the event. For example, with a performance such as a music concert in a large venue, early detection of a crowd moving towards exits of the venue at an unexpected time can provide an indication of panic. Such a detection might alert the venue staff to open additional escape routes which in turn would likely help in minimizing injuries or even loss of life.

However, in a use case where a plurality of users are located in a specific location, embodiments of the present invention provide ways monitor not only telemetry data of an individual, but also of a larger cohort in real time, to allow inference of potential incidents which may affect a wider group rather than the individual. Embodiments also provide an ability to infer a likelihood of minor, major and critical events from collected telemetry data and provide an early warning system to mitigate the consequences of potentially negative events.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are dequeued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 140. Types of computer network 140 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
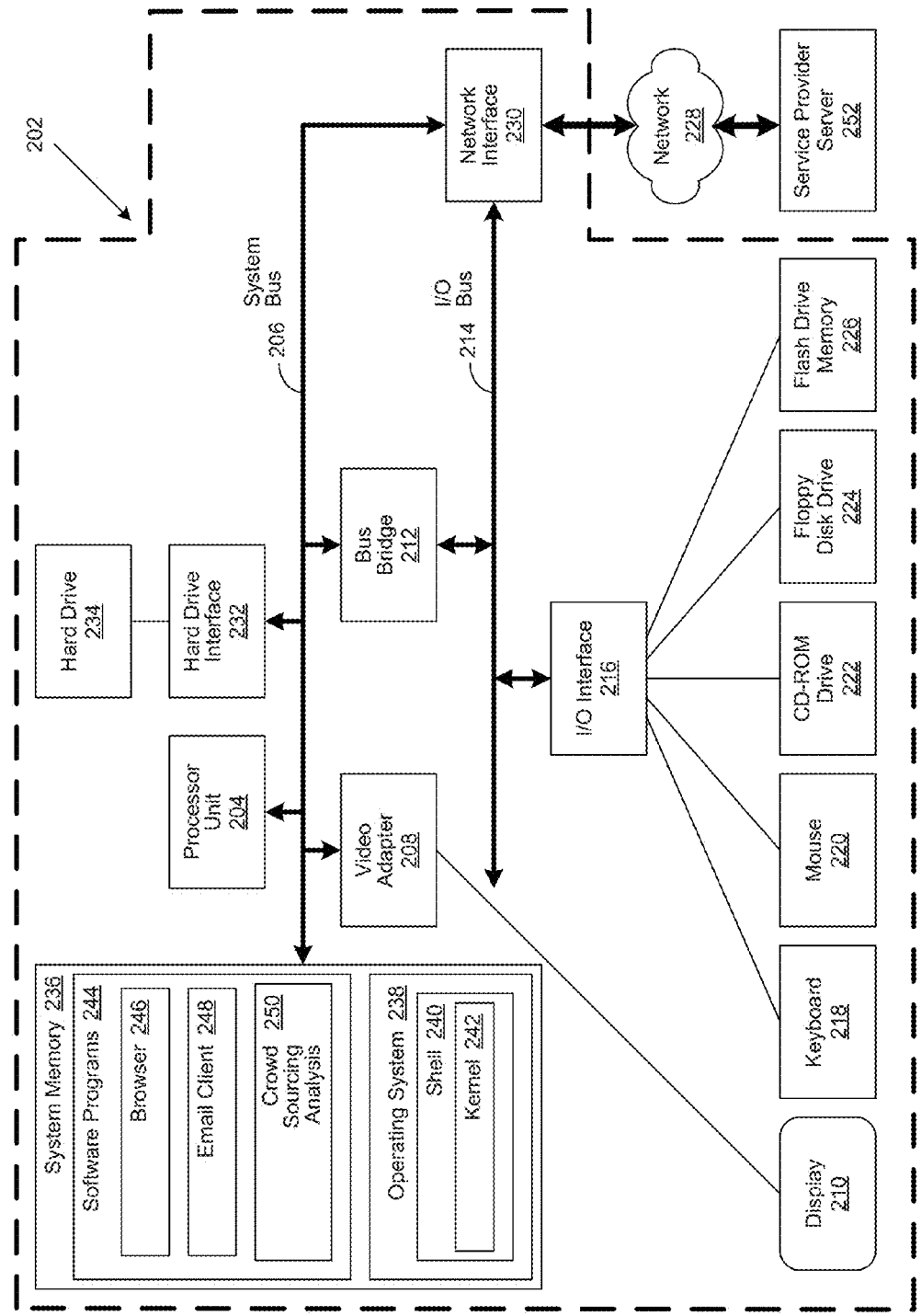
FIG. 2 shows a block diagram of a data processing system.

FIG. 2 illustrates an information handling system 202, more particularly, a processor and common components, which is a simplified example of a computer system capable of performing the computing operations described herein. Information handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226.

The format of the ports connected to I/O interface 216 may be any known to those skilled in the art of computer architecture, including but not limited to Universal Serial Bus (USB) ports.

The information handling system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information handling system 202) to send and receive network messages to the Internet using HyperText Transfer Protocol (HTTP) messaging, thus enabling communication with service provider server 252. In various embodiments, software programs 244 may also include a crowd sourcing analysis module 250. In these and other embodiments, the crowd sourcing analysis module 250 includes code for implementing the processes described hereinbelow. In one embodiment, information handling system 202 is able to download the crowd sourcing analysis module 250 from a service provider server 252.

The hardware elements depicted in the information handling system 202 are not intended to be exhaustive, but rather are representative to highlight components used by the present invention. For instance, the information handling system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
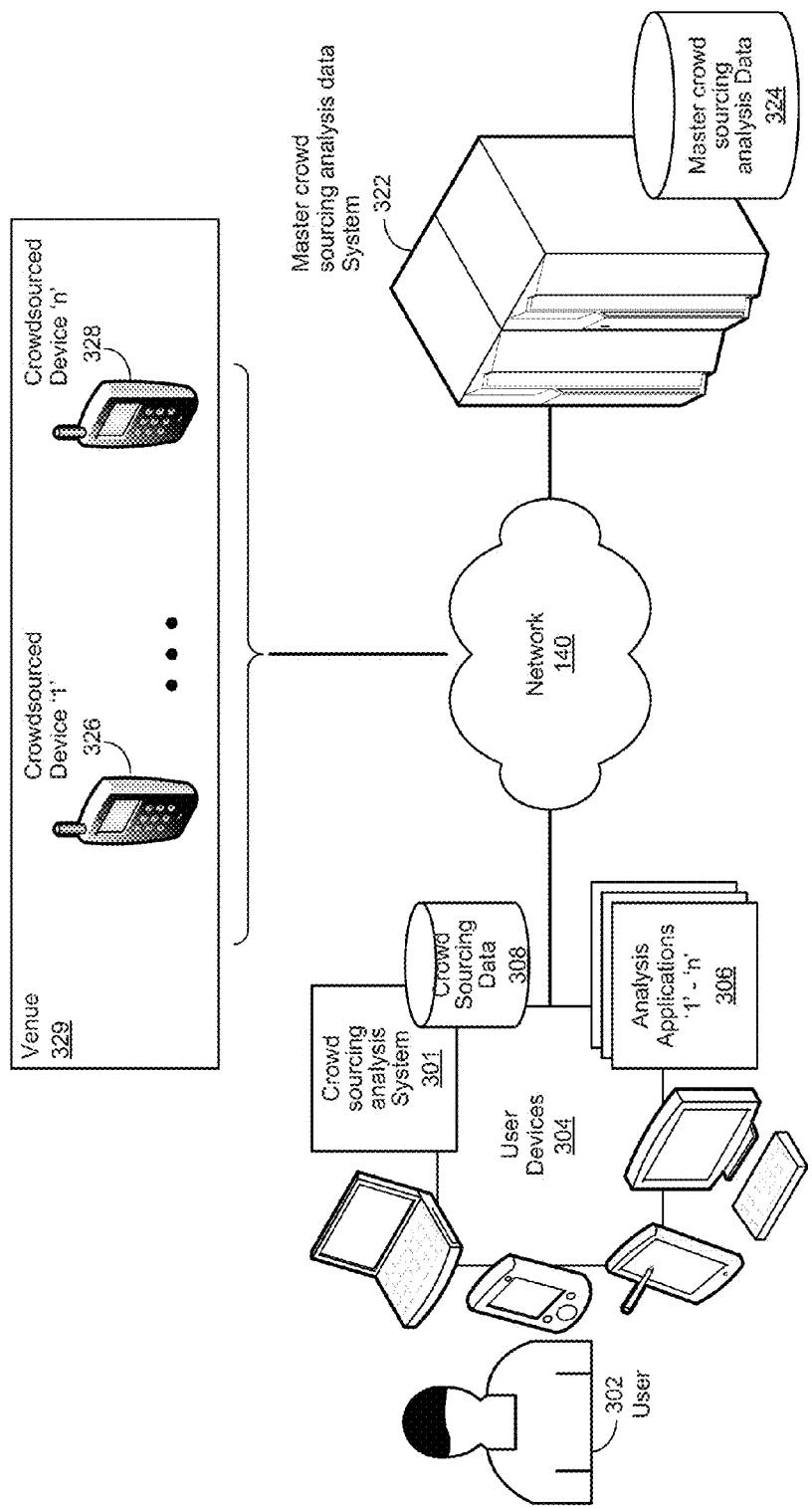
FIG. 3 shows a block diagram of a crowd sourcing environment.

FIG. 3 is a block diagram of a crowd sourcing analysis environment 300 implemented in accordance with an embodiment of the invention. In various embodiments, the operation of a plurality of devices are monitored to perform a crowdsourcing data analysis operation. In various embodiments, a crowd sourcing analysis system 301 is implemented to execute on a user device 304 and to perform a crowd sourcing analysis operation within the crowd sourcing analysis environment 300. In certain embodiments, the crowd sourcing analysis operation may be performed as a hardware operation, a software operation, or a combination thereof. In certain embodiments, the crowd sourcing analysis system 301 includes some or all of the functions performed by the crowd sourcing analysis module 250.

The crowdsourcing data analysis operation receives data from the plurality of crowd sourced devices, aggregates the data received from the plurality of crowd sourced devices and maps the data received from the plurality of crowd sourced devices to a cohort (i.e., a group of individuals used in a study who have something in common). In certain embodiments, the crowdsourcing data analysis operation analyzes the data received from the plurality of crowd sourced devices to provide a deterministic analysis to infer a likelihood of potential incidents related to a group of individuals at any given time. Additionally in certain embodiments, the mapping of the data received from the plurality of crowd sourced devices includes binding the data to a physical or logical location. In certain embodiments, the logical location comprises a social event. Additionally, in certain embodiments, the crowdsourcing data analysis operation includes presenting a visual cue to illustrate the analysis of the data received from the plurality of crowd sourced data via a graphical representation.

As used herein, a user device 304 refers to an information handling system such as a personal computer, a laptop computer, a tablet computer, a personal digital assistant (PDA), a smart phone, a mobile telephone, or other device that is capable of communicating and processing data. In various embodiments, the user device can include one or more analysis applications 306. In various embodiments, the user device 304 includes a repository of crowd sourcing data 308. Also, in certain embodiments the repository of crowd sourcing data 308 includes a crowd sourcing data repository. In certain embodiments, the crowd sourcing data repository may include a crowd sourcing database. Also, in certain embodiments, the crowd sourcing analysis system 301 and the crowd sourcing data 308 may be physically disparate. Also, in certain embodiments, the crowd sourcing analysis system 301 may include a crowd sourcing device agent which executes elsewhere within the crowd sourcing analysis environment 300. Skilled practitioners of the art will realize that many such embodiments are possible and the foregoing is not intended to limit the spirit, scope or intent of the invention.

In various embodiments, the user device 304 is used to communicate data between the crowd sourcing analysis system 301 and a master crowd sourcing analysis data system 322, described in greater detail herein, through the use of a network 140. In certain embodiments, the master crowd sourcing analysis data system 322 includes a repository of master crowd sourcing analysis data 324, likewise described in greater detail herein. In certain embodiments, the master crowd sourcing analysis data 324 is used when performing a crowd sourcing analysis operation of received crowd sourced data. For example, in certain embodiments, the master crowd sourcing analysis data 324 may include data relating to a plurality of venues as well as typical and atypical behaviors associated with each of the plurality of venues.

In various embodiments, the master crowd sourcing analysis data system 322 can include one or more of a relations database management system (RDBMS), a data warehouse, and a not only structure query language (NoSQL) database. Also, in various embodiments, the master crowd sourcing analysis data system 322 can include one or more cloud based databases (e.g., Cloud DB1, Cloud DB2, Cloud DB3, etc.) Skilled practitioners of the art will realize that many such embodiments are possible and the foregoing is not intended to limit the spirit, scope or intent of the invention.

In various embodiments, the network 140 may be a public network, such as the Internet, a physical private network, a virtual private network (VPN), or any combination thereof. In certain embodiments, the network 140 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including various 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

As used herein, a venue profile broadly refers to a profile of a venue (or plurality of venues such as related venues) that can be used as a reference for predicted incidents relating to a particular venue. In various embodiments, the venue profile may be generated based upon data that are crowdsourced from a plurality of devices, such as crowdsourced devices '1' 326 through 'n' 328, some or all of which are located within a venue 329. As used herein, crowdsourcing broadly refers to the process of obtaining needed services, content or other information by soliciting contributions from a group of users, devices or systems. Skilled practitioners of the art will be aware that crowdsourcing is often used to subdivide tedious tasks, processes or operations across multiple contributors, each of which adds a portion of value to the greater result. In various embodiments, each of the crowdsourced devices '1' 326 through 'n' 328 provides their respective data to the crowd sourcing analysis system 301 as well as the master crowd sourcing analysis data system 322. Once received, they are stored in the repository of venue profile data 308. In various embodiments, the network 140 is used by the crowdsourced devices '1' 326 through 'n' 328 to respectively provide their data to the device 304. In various embodiments, the crowd sourced data is also stored in the master crowd sourcing analysis data repository 324.

Ongoing operations are then performed to monitor data generated via the crowdsourced devices as well as other devices accessing the master crowd sourcing data analysis system 322. Skilled practitioners of the art will recognize that many methods for monitoring queries are possible and the foregoing is not intended to limit the spirit, scope or intent of the invention.

Ongoing operations are then performed to store the crowd sourced data as it is collected for subsequent comparison and analysis. The method by which the crowd sourced data is stored, and the format in which it is stored, is a matter of design choice. In various embodiments, the collected data is stored in the repository of crowd sourced data 308. In certain embodiments, a subset of the collected data is stored in the repository of data 308. For example, data associated with an 'n' number of users of the environment may be selected for storage in the repository of data 308 where the users selected for storage may have certain characteristics relevant to the venue analysis. For example, in certain embodiments, the users for which the data is stored (and potentially analyzed) may be located within a particular sub-portion of the venue. Skilled practitioners of the art will recognize that many methods for identifying a number of users for analysis are possible and the foregoing is not intended to limit the spirit, scope or intent of the invention.

Figure 4:
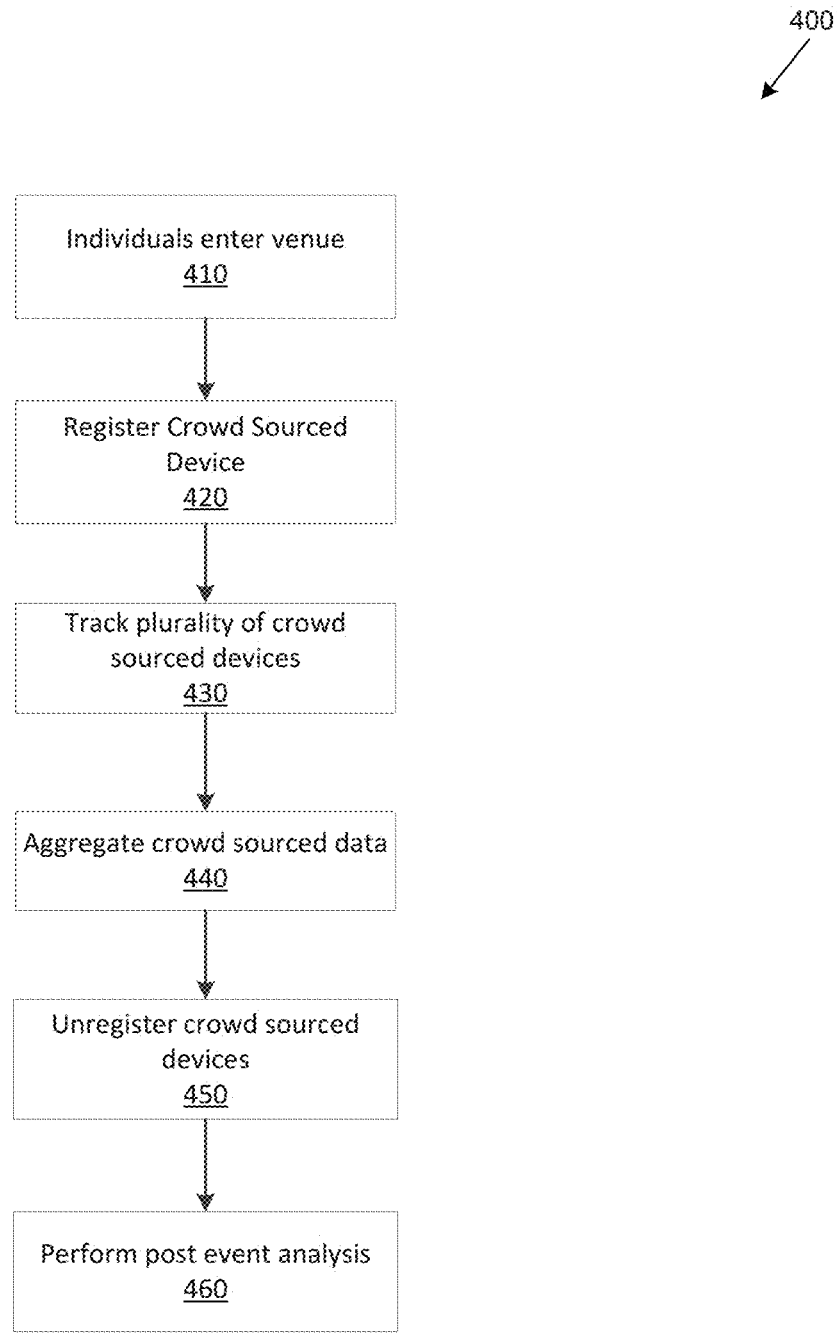
FIG. 4 shows a flow chart of the operation of a crowd sourcing device analysis system.

FIG. 4 shows a flow chart of the operation 400 of a crowd sourcing device analysis system. More specifically, the operation begins at step 410 with individuals having respective data generating devices entering a venue of interest. For example, the venue of interest could correspond to an arena in which a performance or sporting event is to occur. In various embodiments, the individuals are provided with a device such as a wristband or lanyard which contains the device for generating the crowdsourced data. In other embodiments, the device may correspond to a user device as described herein.

Next, at step 420, each crowdsourced device 329 registers with a crowd sourcing data analysis system 301. In certain embodiments, the crowd sourcing data analysis system 301 may be contained either locally or remotely within an overall building management system. Additionally, in various embodiments, the crowdsourced device may include additional identification information which is provided to the crowd sourcing data analysis system 301 when the device is registered. This additional identification information can indicate whether the individual associated with the crowdsourced device 301 could potentially require special attention such as whether the individual may be associated with certain business, medical, political or historical criteria. For example, the individual associated with the crowdsourced device 329 may have a medical condition such as epilepsy or may be a preferred guest for whom guidance to preferred seating may be indicated.

Next, at step 430, the crowd sourcing data analysis system 301 initiates tracking of the plurality of crowd sourced devices 301. Each of the crowd sourced devices provides device data relating to the individual associated with the crowd sourced data. This device data includes one or more of a device location, a device speed, and a device height. In certain embodiments, the device speed of travel is provided as part of the device data. The device location and device speed can also be used to generate a device direction and speed of travel. Additionally in certain embodiments, the device data can also include temperature and light intensity data. Also, in certain embodiments, the device data can include medical data of the individual associated with the device such as heart rate and blood pressure. Certain crowd sourced devices may be considered enhanced crowd sourced devices if the device provides more device data than other devices. In certain applications, enhanced crowd sourced devices might be provided to individuals according to certain criteria. For example, individuals with particular health conditions or certain status (e.g., VIP's) may be provided enhanced crowd sourced devices while other individuals are provided with crowd sourced devices which provide a subset of the data provided by the enhanced crowd sourced devices.

Next, at step 440, the crowd sourcing data analysis system 301 aggregates the crowd sourced data and performs an analysis based upon the crowd sourced data. This analysis includes automatic monitoring for certain conditions and generating alerts when certain conditions are detected. For example, the monitoring might include determining whether concentrations of devices rise above threshold levels. The thresholds might be related to a location within the venue, such that if more than a certain number of individuals are within a predetermined area of the venue then an alert is generated. Also, for example, the monitoring might include determining when device speeds rise over a threshold for a given number of devices. Also for example, the monitoring might include determining when device heights drop below a threshold for a give number of devices. Providing the monitoring and alerts allows the crowd sourcing data analysis system 301 (or the event staff) to proactively address issues in real time. For example, the crowd sourcing data analysis system 301 might automatically turn on emergency systems such as emergency light or sprinkler systems in response to a particular alert. The crowd sourcing data analysis system 301 might also automatically open emergency exits and/or close fire doors in response to a particular alert. The crowd sourcing data analysis system 301 might also automatically request emergency assistance in response to a particular alert.

Additionally, in certain embodiments, the analysis tailored to the data provided by the crowd sourced devices. For example, if the crowd sourced devices provided temperature data, then the crowd sourced data analysis system 301 could perform a heat map analysis using the temperature provided by the plurality of crowd sourced devices.

Next, at step 450, after the event is completed, the crowd sourced devices are unregistered. In certain embodiments when the crowd sourced devices were provided by the event organizers, the crowd sourced devices may also be reclaimed upon completion of the event.

Next, at step 460, the crowd sourcing data analysis system 301 performs a post event analysis of the crowd sourced data received during the event. This post event analysis may be used to provide recommendations for future events. This post event analysis may also be performed by the master crowd sourcing data analysis system 322 and stored to the master crowd sourcing analysis data repository 324 for use in generating more accurate analyses of future events across a plurality of disparate venues which use the crowd sourcing data analysis system 301.

Figure 5:
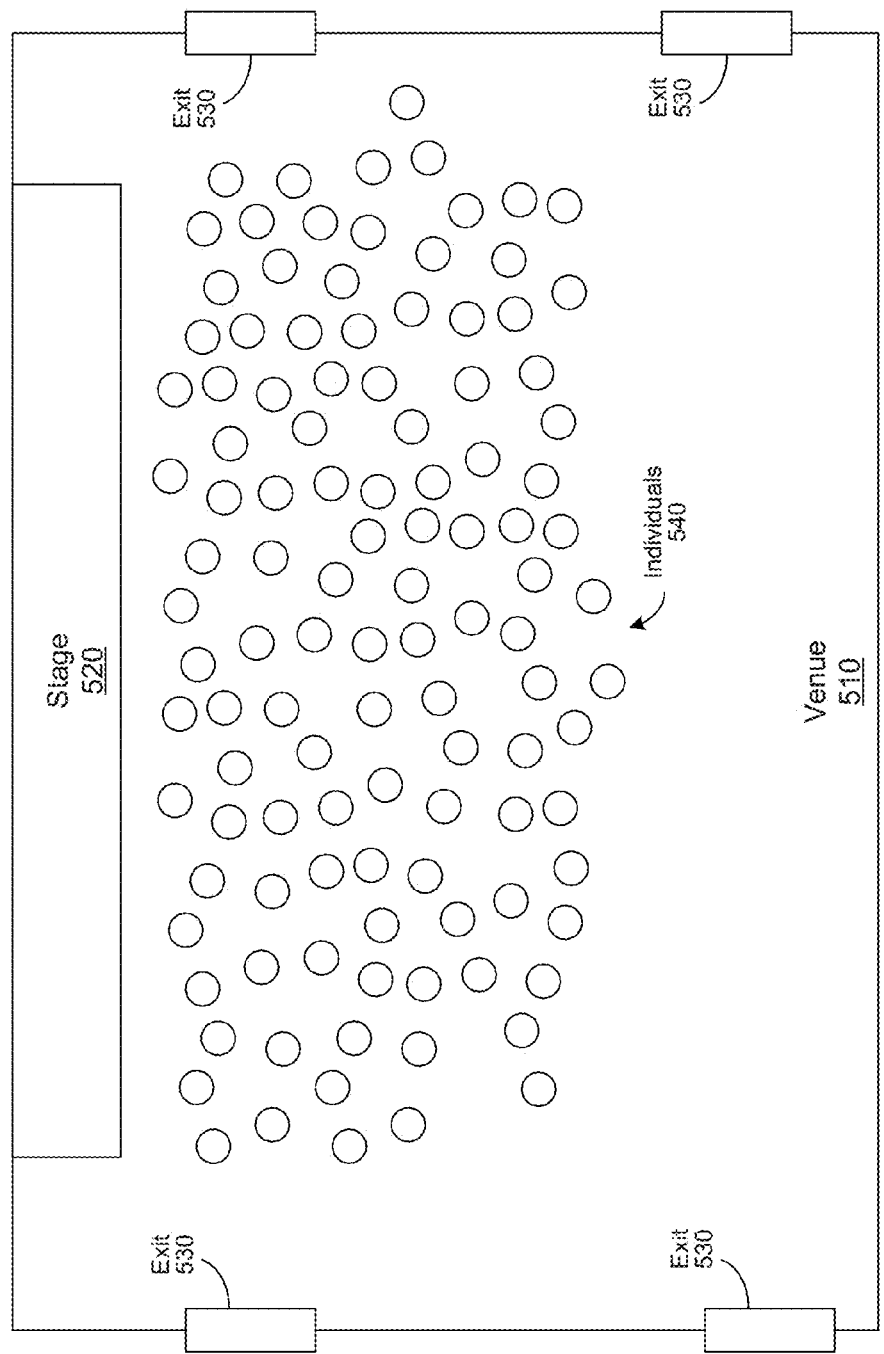
FIG. 5 shows a graphical representation of the operation of a crowd sourcing device analysis system in a venue.
Figure 6:
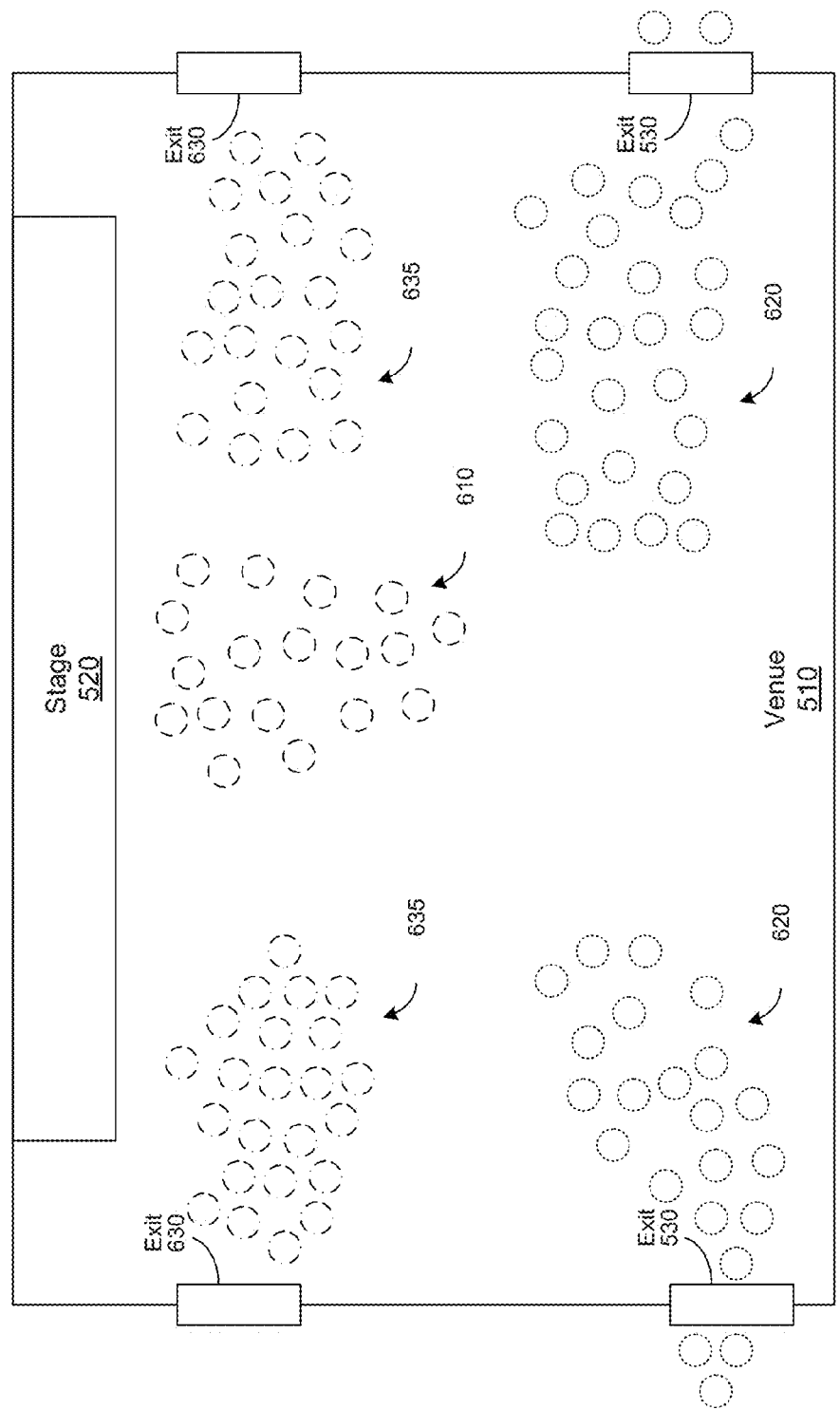
FIG. 6 shows another graphical representation of the operation of a crowd sourcing device analysis system in a venue.

FIG. 5 shows a graphical representation 500 of the operation of a crowd sourcing device analysis system in a venue. FIG. 6 shows another graphical representation 600 of the operation of a crowd sourcing device analysis system in a venue.

More specifically, a representation of the venue 510 includes representations of relevant items within the venue such as a representation of a stage 520 as well as representations of each of a plurality of exits 530. Information relating to the venue is stored within the crowd sourcing data analysis system 301. In certain embodiments, the information includes physical information such as dimensions of the venue as well as safety information such as safety equipment (such as fire alarms, sprinkler systems, etc.) included within the venue. In certain embodiments, the information of the venue is downloaded from the master crowd sourcing data analyses system 322. In certain embodiments, information gathered from similar venues (e.g., venues having substantially (e.g., +/−10%) the same physical size, substantially (e.g., +/−10%) the same capacity or a similar layout is also provided to the crowd sourcing data analysis system 301.

Some or all of the individuals 540 attending the event at the venue have associated crowd sourced data devices. When performing the analysis of the event, if there are no potential issues detected from the analysis of the data received from the plurality of crowd sourced data individuals within a venue are represented as green dots on the representation of the venue 510. If some individuals are exhibiting some negative behavior as recorded or indicated by their sensor data, the presentation corresponding to those individuals is represented as yellow dots (e.g., individuals 610). If a serious problem with a cohort or group is detected based upon the analysis of the crowd sourced data from a plurality of individuals, then the presentation corresponding to those individuals is represented as red (e.g., individuals 620). In certain embodiments, because more individuals would likely be involved in the serious problem, the red presentation is also more visible because more dots are represented as red. Also, in certain embodiments, an additional warning (such as flashing of the red dots or a separate warning indication which could include a visual presentation and/or an audio indication) is generated. For example, in the example shown in FIG. 6 an additional warning 635 is generated with respect to the exits 630 because the crowd sourced device data is indicating that the patrons are bunching at these exits and none have passed through the exits, indicating an additional potential problem with these portions of the venue.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A system comprising:
   a processor;
   a data bus coupled to the processor; and
   a non-transitory, computer-readable storage medium embodying computer program code for performing a crowdsourcing data analysis operation within a crowdsourcing analysis environment, the crowdsourcing analysis environment comprising a plurality of devices, a crowdsourcing analysis system executing on a user device and a master crowdsourcing analysis data system, the plurality of devices, the user device and the master crowdsourcing analysis system communicating data via a network, the non-transitory, computer-readable storage medium being coupled to the data bus, the computer program code interacting with a plurality of computer operations and comprising instructions executable by the processor and configured for:
   receiving data from a plurality of crowd sourced devices via the network;
   aggregating the data received from the plurality of crowd sourced devices via at least one of the crowdsourcing analysis system and the master crowdsourcing analysis data system; and,
   mapping, via at least one of the crowdsourcing analysis system and the master crowdsourcing analysis data system, the data received from the plurality of crowd sourced devices to a cohort, the cohort representing a group of individuals who have something in common.

2. The system of claim 1, where the instructions executable by the processor are further configured for:

analyzing the data received from the plurality of crowd sourced devices to provide a deterministic analysis of the data received from the plurality of crowd sourced devices, the deterministic analysis enabling an inference of a likelihood of potential incidents related to a group of individuals at any given time.

3. The system of claim 2, where the instructions executable by the processor are further configured for:

presenting a visual cue to illustrate the analysis of the data received from the plurality of crowd sourced data via a graphical representation.

4. The system of claim 1, wherein:

the mapping of the data received from the plurality of crowd sourced devices includes binding the data to a venue.

5. The system of claim 4, wherein:

the venue comprises at least one of a physical location and a logical location.

6. The system of claim 1, where the instructions executable by the processor are further configured for:

registering each of the plurality of crowd sourced devices as each device enters the venue; and, deregistering each of the plurality of crowd sourced devices as each device exits the venue.

7. A non-transitory, computer-readable storage medium embodying computer program code for performing a crowdsourcing data analysis operation within a crowdsourcing analysis environment, the crowdsourcing analysis environment comprising a plurality of devices, a crowdsourcing analysis system executing on a user device and a master crowdsourcing analysis data system, the plurality of devices, the user device and the master crowdsourcing analysis system communicating data via a network, the computer program code comprising computer executable instructions configured for:

receiving data from a plurality of crowd sourced devices via the network;

aggregating the data received from the plurality of crowd sourced devices via at least one of the crowdsourcing analysis system and the master crowdsourcing analysis data system; and, mapping, via at least one of the crowdsourcing analysis system and the master crowdsourcing analysis data system, the data received from the plurality of crowd sourced devices to a cohort, the cohort representing a group of individuals who have something in common.

8. The non-transitory, computer-readable storage medium of claim 7, where the computer executable instructions are further configured for:

analyzing the data received from the plurality of crowd sourced devices to provide a deterministic analysis of the data received from the plurality of crowd sourced devices, the deterministic analysis enabling an inference of a likelihood of potential incidents related to a group of individuals at any given time.

9. The non-transitory, computer-readable storage medium of claim 8, where the computer executable instructions are further configured for:

presenting a visual cue to illustrate the analysis of the data received from the plurality of crowd sourced data via a graphical representation.

10. The non-transitory, computer-readable storage medium of claim 7, wherein:

the mapping of the data received from the plurality of crowd sourced devices includes binding the data to a venue.

11. The non-transitory, computer-readable storage medium of claim 10, wherein:

the venue comprises at least one of a physical location and a logical location.

12. The non-transitory, computer-readable storage medium of claim 7, where the computer executable instructions are further configured for:

registering each of the plurality of crowd sourced devices as each device enters the venue; and, deregistering each of the plurality of crowd sourced devices as each device exits the venue.

* * * * *